(12) United States Patent
Ishizaki

(10) Patent No.: US 10,719,494 B2
(45) Date of Patent: Jul. 21, 2020

(54) ACCELERATING OPERATIONS IN B+-TREE

(71) Applicant: INTERNATIONAL BUSINESS MACHINES CORPORATION, Armonk, NY (US)

(72) Inventor: Kazuaki Ishizaki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 984 days.

(21) Appl. No.: 14/819,675

(22) Filed: Aug. 6, 2015

(65) Prior Publication Data
US 2017/0039231 A1 Feb. 9, 2017

(51) Int. Cl.
*G06F 16/00* (2019.01)
*G06F 16/22* (2019.01)
*G06F 16/2453* (2019.01)

(52) U.S. Cl.
CPC .... *G06F 16/2246* (2019.01); *G06F 16/24539* (2019.01); *G06F 16/24549* (2019.01)

(58) Field of Classification Search
CPC ......... G06F 17/20598; G06F 17/30327; G06F 16/2246; G06F 16/24539; G06F 16/4549
USPC ................................................. 707/737, 715
See application file for complete search history.

(56) References Cited

U.S. PATENT DOCUMENTS

| | | | |
|---|---|---|---|
| 5,748,952 A | 5/1998 | Chadha et al. | |
| 6,711,562 B1 * | 3/2004 | Ross | G06F 17/30327 707/741 |
| 8,190,591 B2 | 5/2012 | Shinjo et al. | |
| 8,204,912 B2 | 6/2012 | Bamford et al. | |
| 8,682,872 B2 | 3/2014 | Bright | |
| 8,700,670 B2 | 4/2014 | Marathe et al. | |
| 8,880,488 B1 | 11/2014 | Xie et al. | |
| 2009/0313418 A1 * | 12/2009 | Ross | G06F 12/0246 711/103 |
| 2010/0076940 A1 * | 3/2010 | Bordawekar | G06F 17/30961 707/704 |

(Continued)

OTHER PUBLICATIONS

Gerth Stolting Brodal, "Finger Search Trees", In Handbook of Data Structures and Applications, Chapter 11, CRC Press, 2005, 11 Pages.

(Continued)

*Primary Examiner* — Monica M Pyo
(74) *Attorney, Agent, or Firm* — Tutunjian & Bitetto, P.C.; Vazken Alexanian

(57) ABSTRACT

Methods and a system are provided for accelerating an operation in a B+-tree. A method including forming triplets, by a triplet manager. Each of the triplets includes a pointer to a leaf node, a lower bound of a key on the leaf node, and an upper bound of the key on the leaf node. The method further includes performing, by the triplet manager, a lookup operation on the triplets responsive to the operation to avoid traversals of intermediate nodes for the operation. The method also includes executing, by a processor, the operation in the B+-tree while avoiding the traversals of the intermediate nodes for the operation responsive to a result of the lookup operation. The operation is any one of an insertion operation, a deletion operation, and a search operation.

19 Claims, 8 Drawing Sheets

(56) References Cited

U.S. PATENT DOCUMENTS

| | | | |
|---|---|---|---|
| 2010/0082664 A1* | 4/2010 | Odaira | G06F 17/30327 |
| | | | 707/769 |
| 2010/0174690 A1* | 7/2010 | Marcotte | G06F 16/178 |
| | | | 707/695 |
| 2013/0159250 A1* | 6/2013 | Marcotte | G06F 16/178 |
| | | | 707/610 |
| 2015/0178375 A1* | 6/2015 | Ishizaki | G06F 17/30598 |
| | | | 707/737 |

OTHER PUBLICATIONS

Chen et al., "Improving Index Performance through Prefetching", ACM SIGMOD, May 2001, 12 Pages.
http://en.wikipedia.org/wiki/Finger_search_tree, Wikipedia, Finger Search Tree, Jun. 2014, 2 Pages.
Rao, "Making B+-Trees Cache Conscious in Main Memory", ACM May 2000, pp. 475-486.

* cited by examiner

ACCELERATING OPERATIONS IN B+-TREE

BACKGROUND

Technical Field

The present invention relates generally to information processing and, in particular, to accelerating operations in a B+-tree.

Description of the Related Art

A B+-Tree effectively performs an insertion/search/deletion of a record (a pair of key and value) with its key. The following are characteristics of a B+-tree: (1) all of the records in a B+-tree exist in leaf nodes, and root and intermediate nodes holds only keys; and (2) a node has pointers to refer to one or more nodes.

Often it is the case that a large number of records must be inserted into a tree structure. This leads to time-consuming insert operations. For example, in a benchmark of a product for business intelligence, insert operations consumed 10% of CPU times. Thus, there is a need to accelerate an insertion and other operations in a B+-tree structure.

SUMMARY

According to an aspect of the present principles, a method for accelerating an operation in a B+-tree is provided. The method including forming triplets, by a triplet manager. Each of the triplets includes a pointer to a leaf node, a lower bound of a key on the leaf node, and an upper bound of the key on the leaf node. The method further includes performing, by the triplet manager, a lookup operation on the triplets responsive to the operation to avoid traversals of intermediate nodes for the operation. The method also includes executing, by a processor, the operation in the B+-tree while avoiding the traversals of the intermediate nodes for the operation responsive to a result of the lookup operation. The operation is any one of an insertion operation, a deletion operation, and a search operation.

According to another aspect of the present principles, a computer program product for accelerating an operation in a B+-tree is provided. The computer program product includes a computer readable storage medium having program instructions embodied therewith. The program instructions are executable by a computer to cause the computer to perform a method. The method includes the step of forming triplets, by a triplet manager. Each of the triplets includes a pointer to a leaf node, a lower bound of a key on the leaf node; and an upper bound of the key on the leaf node. The method further includes performing, by the triplet manager, a lookup operation on the triplets responsive to the operation to avoid traversals of intermediate nodes for the operation. The method also includes executing, by a processor, the operation in the B+-tree while avoiding the traversals of the intermediate nodes for the operation responsive to a result of the lookup operation. The operation is any one of an insertion operation, a deletion operation, and a search operation.

According to yet another aspect of the present principles, a system for accelerating an operation in a B+-tree is provided. The system includes a triplet manager for forming triplets and performing a lookup operation on the triplets responsive to the operation to avoid traversals of intermediate nodes for the operation. Each of the triplets includes a pointer to a leaf node, a lower bound of a key on the leaf node, and an upper bound of the key on the leaf node. The system also includes a processor for executing the operation in the B+-tree while avoiding the traversals of the intermediate nodes for the operation responsive to a result of the lookup operation. The operation is any one of an insertion operation, a deletion operation, and a search operation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to accelerating operations in a B+-tree. In an embodiment, the operations can be any of an insertion operation, a search operation, and a deletion operation.

In an embodiment, triplets [a pointer to a leaf node, its lower bound, it upper bound] are stored for the B+-tree, and a look up is performed on the triplets to avoid traversals of intermediate node when an operation on the B+-tree is performed.

Figure 1:
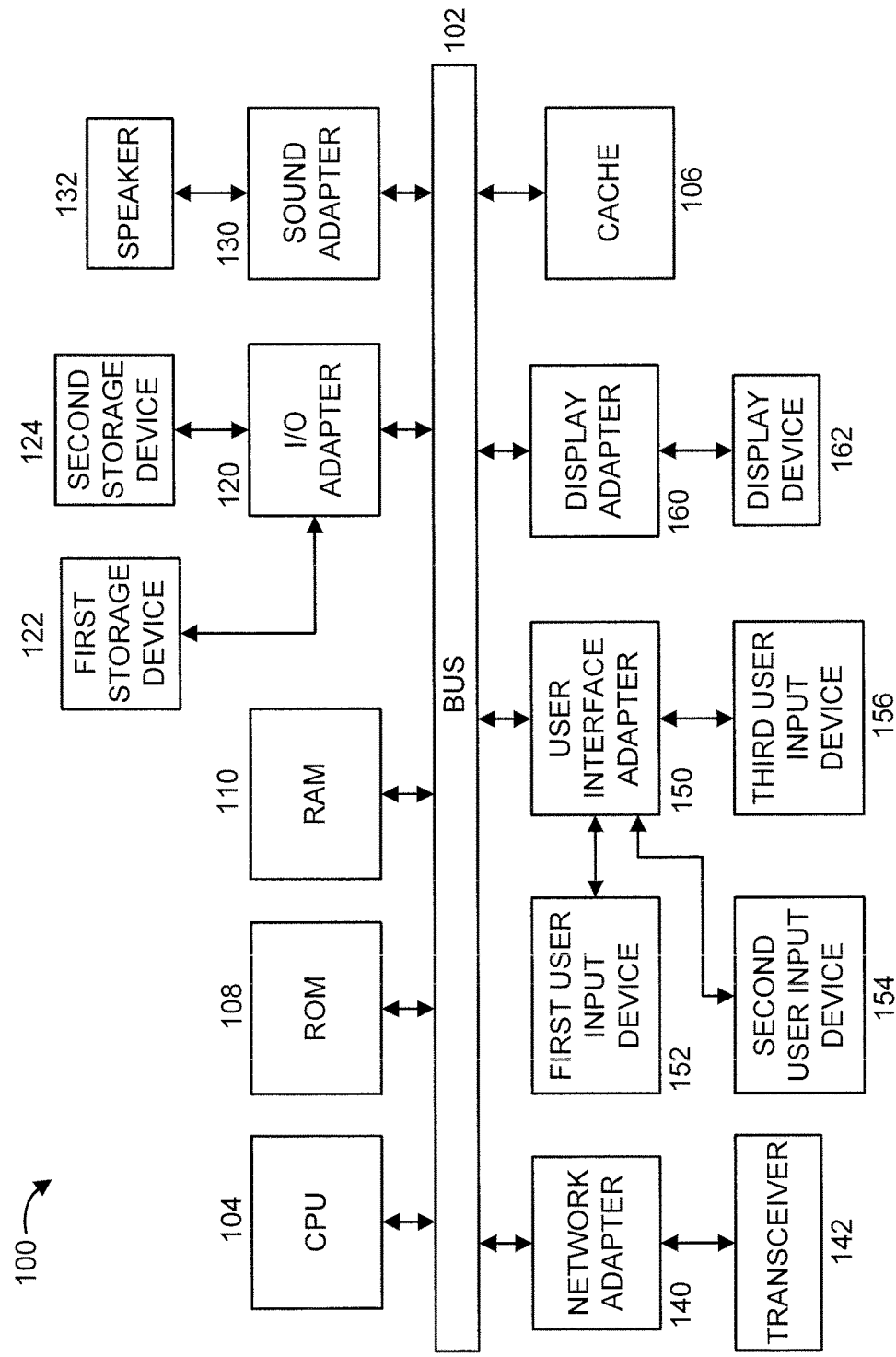
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
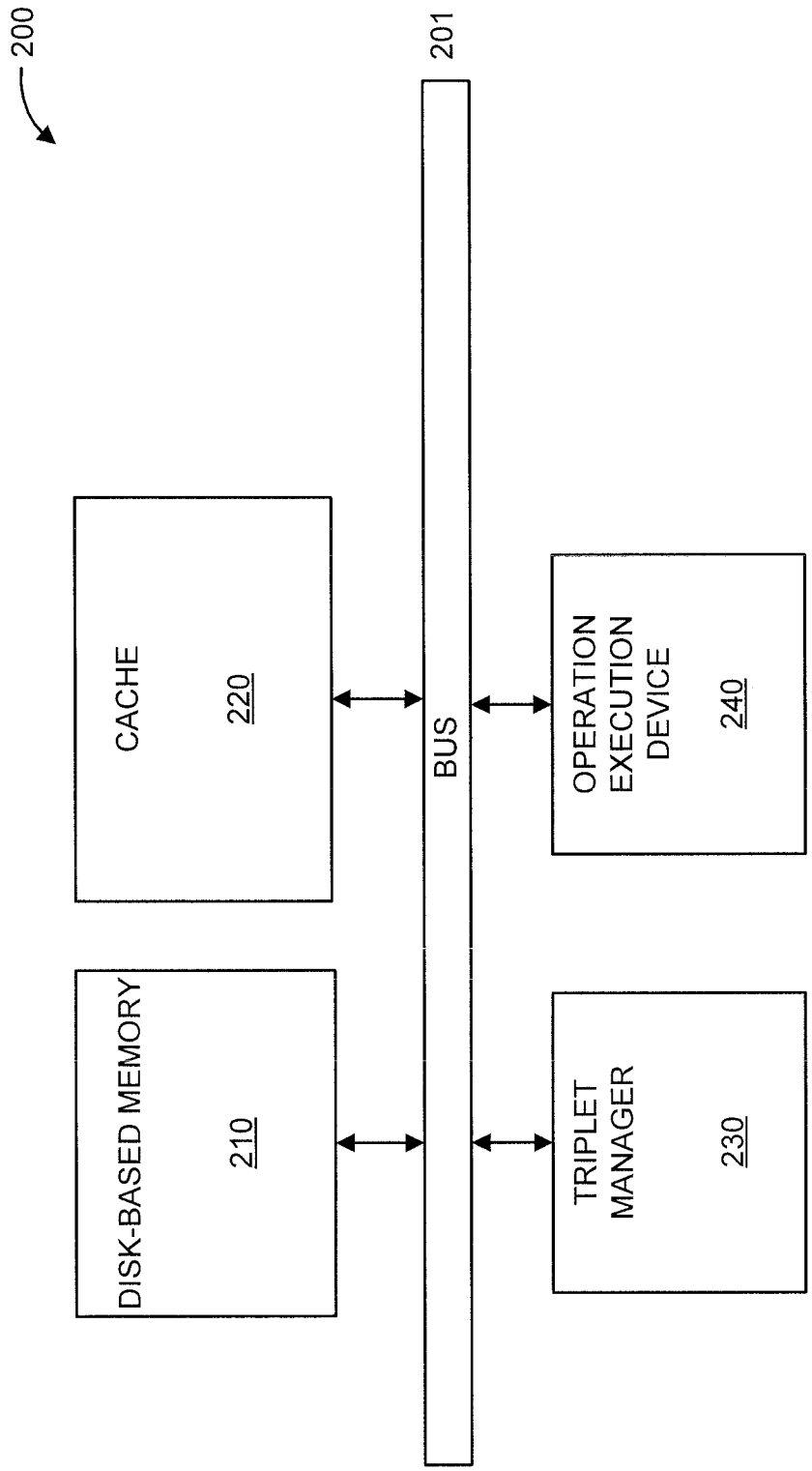
FIG. 2 shows an exemplary system 200 for accelerating an operation in a B+-tree, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
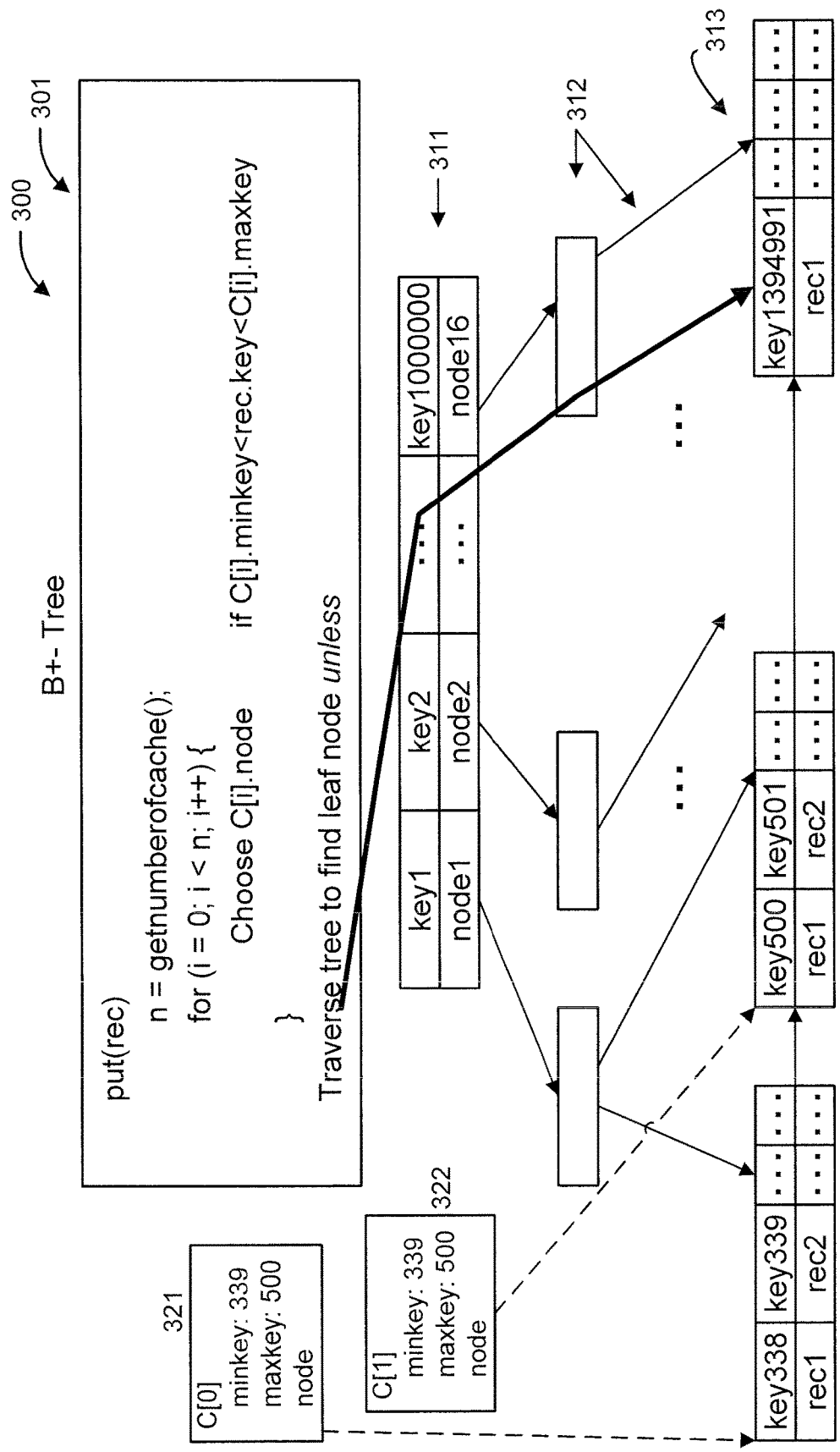
FIG. 3 shows an overview of an insertion operation 300 in a B+-tree, in accordance with an embodiment of the present principles.
Figure 4:
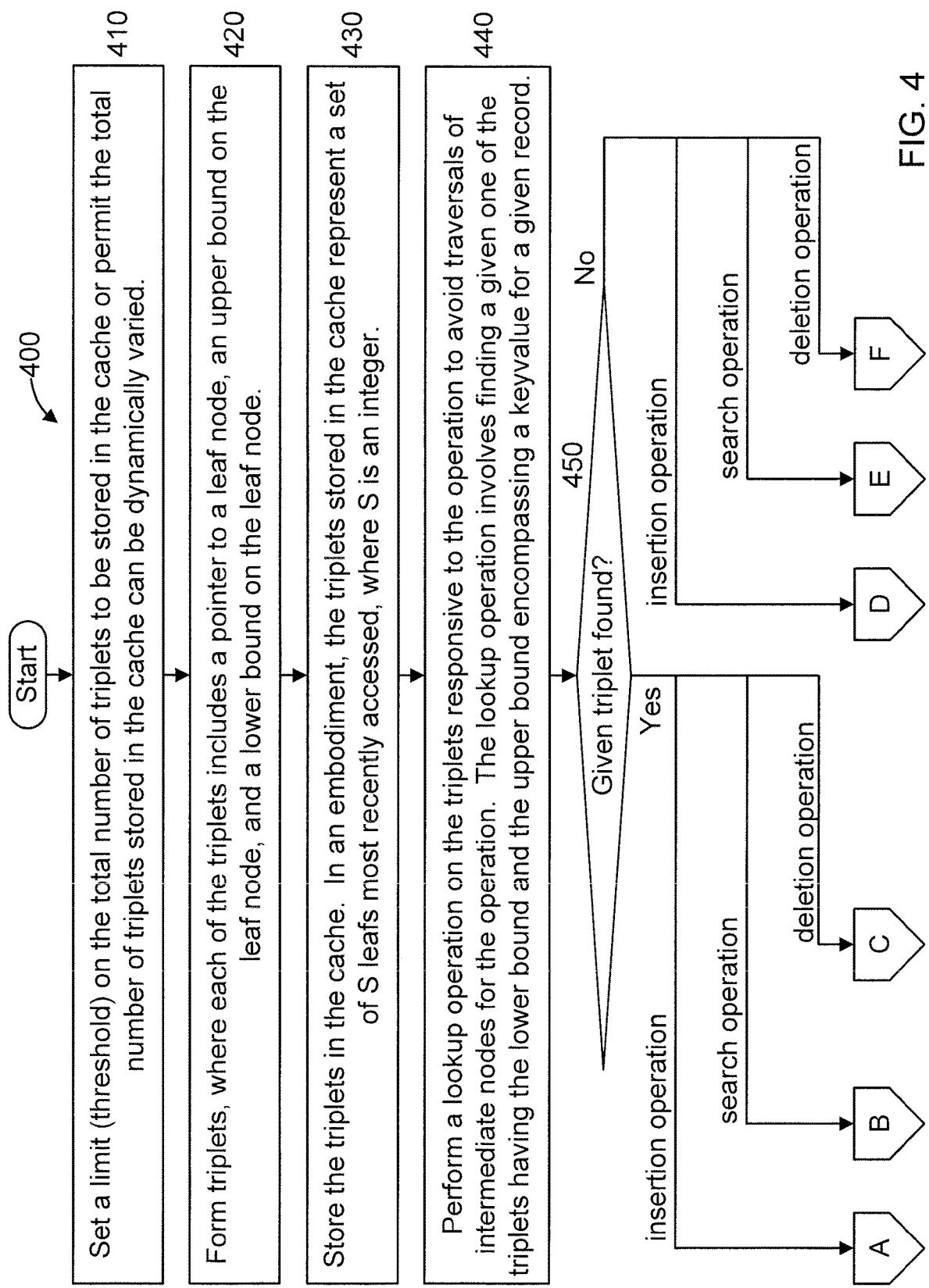
FIGS. 4-6 show an exemplary method 400 for accelerating operations in a B+-tree, in accordance with an embodiment of the present principles.
Figure 5:
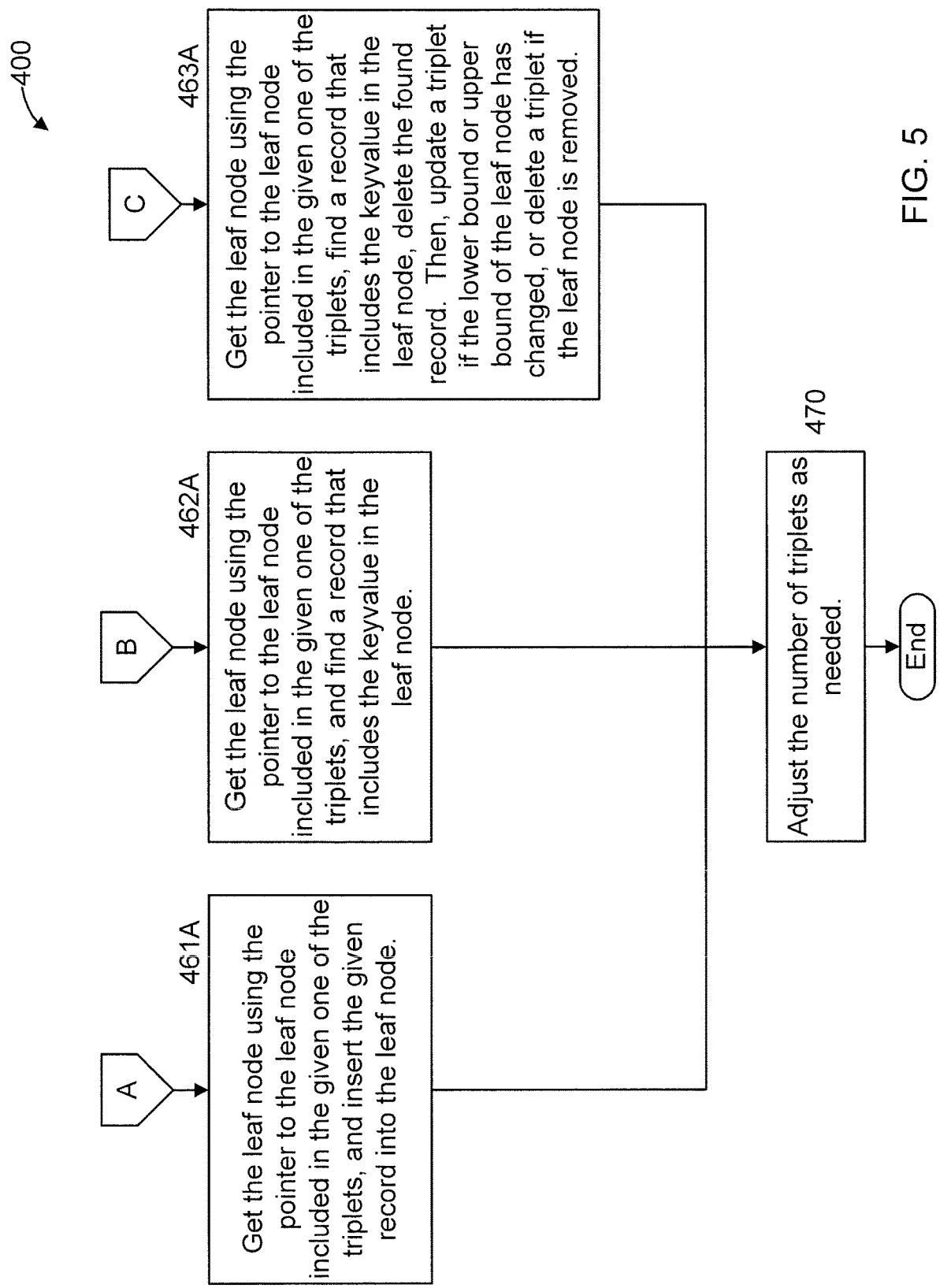
Figure 6:
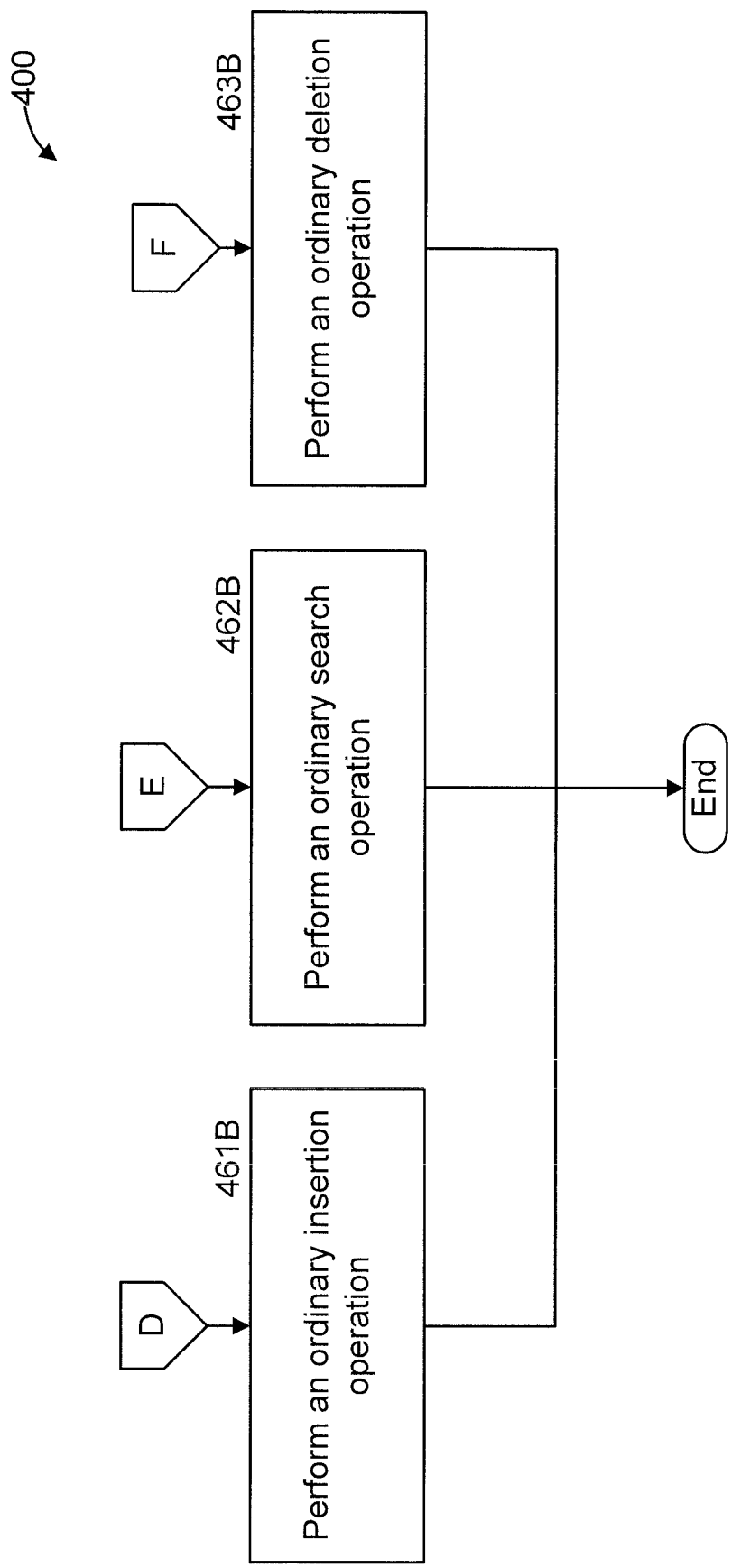
Figure 7:
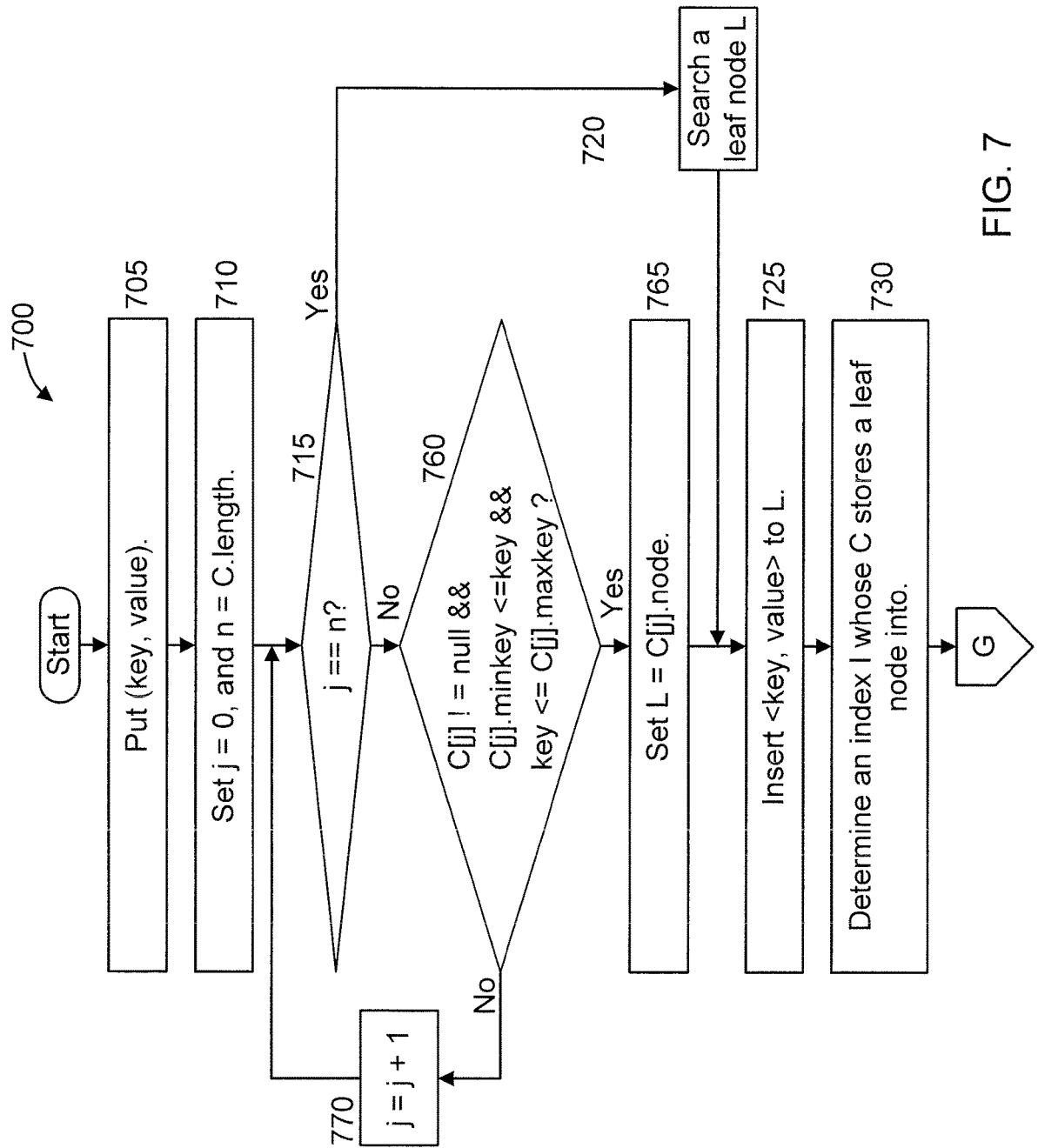
FIGS. 7-8 show an exemplary method 700 for accelerating an insertion operation in a B+-tree, in accordance with an embodiment of the present principles.
Figure 8:
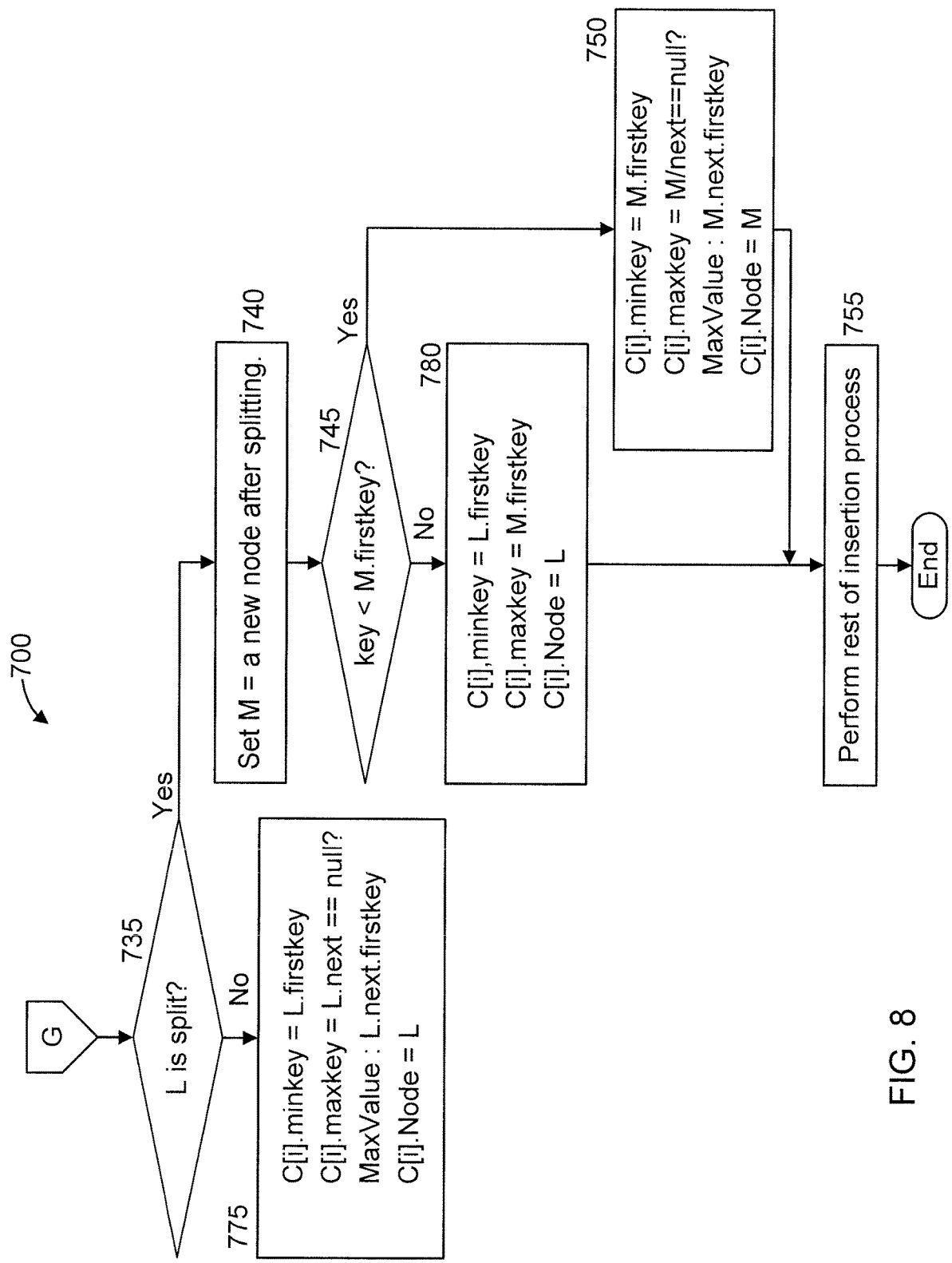

Further, it is to be appreciated that processing system 100 may perform at least part of the method described herein including, for example, at least part of the insertion operation 300 of FIG. 3 and/or at least part of method 400 of FIGS. 4-6 and/or at least part of method 700 of FIGS. 7-8. Similarly, part or all of system 200 may be used to perform at least part of the insertion operation 300 of FIG. 3 and/or at least part of method 400 of FIGS. 4-6 and/or at least part of method 700 of FIGS. 7-8.

FIG. 2 shows an exemplary system 200 for accelerating operations in a B+-tree, in accordance with an embodiment of the present principles.

The system 200 includes a disk-based (e.g., hard disk, optical disk) memory 210, a cache memory 220, a triplet manager 230, and an operation execution device 240.

The disk-based memory 210 stores a B+-tree having key-value pairs for a plurality of records.

The cache 220 stores triplets. In an embodiment, the total number of triplets stored in the cache is fixed. In an embodiment, the total number of triplets stored in the cache is dynamically variable.

The triplet manager 230 generates and manages the triplets. Each of the triplets includes a pointer to a leaf node, a lower bound, and an upper bound. The lower bound and the upper bound are compared, by the triplet manager 230, to keys (of key-value pairs) to determine if a respective key is within the bounds, as described in further detail herein below. The triplet manager 230 can fix the total number of triplets or can dynamically vary the number of triplets stored in the cache 220, depending upon the implementation. The triplet manager 230 also performs searches on the triplets for operations performed in the B+-tree such as, for example, insertion, search, and deletion operations. Additionally, the triplet manager causes the insertion, removal, and retrieval of records, as further described herein.

The operation execution device 240 performs (executes) operations on the B+-tree. In an embodiment, the operation execution device 240 advantageously executes an operation the B+-tree so as to avoid traversals of intermediate notes (e.g., based on a result of a triplet search and/or the results of a lookup operation on a table or other data structure). The operation execution device 240 can be a processor, an arithmetic unit, and/or so forth.

In the embodiment shown in FIG. 2, the elements thereof are interconnected by a bus 201. However, in other embodiments, other types of connections can also be used. Moreover, in an embodiment, at least one of the elements of system 200 is processor-based. Also, while a disk-based memory and a cache are described with respect to system 200, the present principles are not limited to solely these memory types and, thus, other memory types including the same memory type for both can be used in accordance with the teachings of the present principles. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIG. 3 shows an overview of an insertion operation 300 in a B+-tree, in accordance with an embodiment of the present principles.

The insertion operation pertains to the following pseudo-code:

```
put(rec)
    n = getnumberofcache( );
    for (i = 0; i < n; i++) {
        Choose C[i].node    if C[i].minkey<rec.key<C[i].maxkey
    }
Traverse tree to find leaf node unless
```

In the preceding pseudocode, rec denotes a record, $C[i]$ denotes a cache i, $C[i].node$ denotes a node that points to a leaf node in cache i, i denotes a variable, minkey denotes the lower bound included in a triplet, maxkey denotes an exclusive upper bound included in a triplet, and rec.key denotes the key for a particular record.

The B+-tree 301 includes a root node 311, intermediate (internal) nodes 312, and leaf nodes 313. The root node 311 and intermediate nodes hold only keys, while the leaf nodes 313 hold all of the records and corresponding keys (key-value pairs). Elements 321 and 322 hold a node that is cached, its lowest keyvalue (i.e., minkey), and its exclusive highest keyvalue (i.e., maxkey).

The insertion operation 300 performs an insertion operation of a record into a particular node when the record key (i.e., rec.key) falls within the following parameters of the given node: $C[i].minkey<rec.key<C[i].maxkey$ FIGS. 4-6 show an exemplary method 400 for accelerating operations in a B+-tree, in accordance with an embodiment of the present principles. The operation can be any of an insertion operation (steps 461A, 461B), a search operation (steps 462A, 462B) and/or a deletion operation (steps 463A, 463B).

At step 410, set a limit (threshold) on the total number of triplets to be stored in the cache or permit the total number of triplets stored in the cache can be dynamically varied.

At step 420, form triplets, where each of the triplets includes a pointer to a leaf node, an upper bound on the leaf node, and a lower bound on the leaf node.

At step 430, store the triplets in the cache. In an embodiment, the triplets stored in the cache represent a set of S leafs most recently accessed, where S is an integer.

At step 440, perform a lookup operation on the triplets responsive to the operation to avoid traversals of intermediate nodes for the operation. Step 440 involves finding a given one of the triplets having the lower bound and the upper bound encompassing a keyvalue for a given record.

At step 450, determine whether the given one of the triplets (having the lower bound and the upper bound encompassing the keyvalue for the given record) has been found. If so, proceed to step 461A for an insertion operation, proceed to step 462A for a search operation, and/or proceed to step 463A for a deletion operation. Otherwise, proceed to step 461B for an insertion operation, proceed to step 462B for a search operation, and/or proceed to step 463B for a deletion operation.

At step 461A, get the leaf node using the pointer to the leaf node included in the given one of the triplets, and insert the given record into the leaf node.

At step 462A, get the leaf node using the pointer to the leaf node included in the given one of the triplets, and find a record that includes the keyvalue in the leaf node.

At step 463A, get the leaf node using the pointer to the leaf node included in the given one of the triplets, find a record that includes the keyvalue in the leaf node, delete the found record. Then, update a triplet if the lower bound or upper bound of the leaf node has changed, or delete a triplet if the leaf node is removed.

At step 461B, perform an ordinary (conventional) insertion operation.

At step 462B, perform an ordinary (conventional) search operation.

At step 463B, perform an ordinary (conventional) deletion operation.

At step 470, adjust the number of triplets as needed. In an embodiment, step 470 can involve limiting a total number of triplets up to maximum threshold number of triplets, and deleting a particular record when the total number of triplets exceeds the maximum threshold number of triplets. For example, adjust the number of triplets to $((\log n)-1)*d/2*a$, where d is the number of pointers to child nodes in an intermediate node in the B+-tree, n is the number of records in the B+-tree, and a is a constant. In an embodiment, a has a value that depends on a target system. The present principles are not limited to any particular selection technique for determining which record is to be deleted. Thus, any selection technique can be used including, but not limited to, least recently used (LRU), most recently used (MRU), least frequency used (LFU), random replacement (RR), and so forth.

FIGS. 7-8 show an exemplary method 700 for accelerating an insertion operation in a B+-tree, in accordance with an embodiment of the present principles.

In the embodiment of FIG. 7, L denotes a leaf node to be inserted <key, value>, minkey denotes the lower bound included in a triplet, maxkey denotes an upper bound included in a triplet, C denotes a cache, C.length denotes the number of the cache, M denotes a new node after a splitting operation, and j is a variable.

At step 705, put (key, value).

At step 710, set j=0, and n=C.length.

At step 715, determine whether j=n. If so, then the method proceeds to step 720. Otherwise, the method proceeds to step 760.

At step 720, search a leaf node L.

At step 725, insert <key, value> to L.

At step 730, determine an index I whose C stores a leaf node L.

At step 735, determine whether L is split. If so, then the method proceeds to step 740. Otherwise, the method proceeds to step 775.

At step 740, set M=a new node after splitting.

At step 745, determine whether key <M.firstkey. If so, then the method proceeds to step 750. Otherwise, the method proceeds to step 780.

At step 750,
C[i].minkey=M.firstkey
C[i].maxkey=M/next==null?
MaxValue: M.next.firstkey
C[i].Node=M At step 755, perform an ordinary (conventional) insertion process in a case of splitting a leaf node. As a conventional insertion operation is known to one of ordinary skill in the art, it is not further elaborated on herein.

At step 760, determine whether
C[j] !=null &&
C[j].minkey <=key &&
key <=C[j].maxkey
If so, then the method proceeds to step 765. Otherwise, the method proceeds to step 770.

At step 765, set L=C[j].node.

At step 770, set j=j+1 (i.e., increment j by 1).

At step 775,
C[i].minkey=L.firstkey
C[i].maxkey=L.next==null?
MaxValue: L.next.firstkey
C[i].Node=L At step 780,
C[i],minkey=L.firstkey
C[i].maxkey=M.firstkey
C[i].Node=L The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for accelerating an operation in a B+-tree, the method comprising:
    storing, by a disk-based memory, the B+-tree;
    storing, by a cache separate from the disk-based memory, triplets, each of the triplets including a pointer to a leaf node, a lower bound of a key on the leaf node, and an upper bound of the key on the leaf node;
    performing, by a triplet manager, a lookup operation on the triplets responsive to the operation to avoid traversals of intermediate nodes for the operation; and
    executing, by a processor, the lookup operation in the B+-tree while avoiding the traversals of the intermediate nodes for the operation responsive to a result of the lookup operation,
    wherein the operation is any one of an insertion operation, a deletion operation, and a search operation, and wherein the triplets are stored only in the cache, and are not stored in the disk-based memory.

2. The method of claim 1, further comprising storing the triplets in a cache memory device.

3. The method of claim 2, wherein the triplets stored in the cache memory device represent a set of S leafs most recently accessed, where S is an integer.

4. The method of claim 2, further comprising constraining a total number of triplets stored in the cache memory device to a fixed number.

5. The method of claim 2, further comprising dynamically varying a total number of triplets stored in the cache memory device.

6. The method of claim 1, wherein performing the lookup operation comprises finding a given one of the triplets having the lower bound and the upper bound encompassing a keyvalue for a given record.

7. The method of claim 6, wherein said executing step comprises, responsive to finding the given one of the triplets having the lower bound and the upper bound encompassing the keyvalue for the given record, and the operation being the insertion operation:
    retrieving the leaf node using the pointer to the leaf node included in the given one of the triplets; and
    inserting the given record into the leaf node.

8. The method of claim 6, wherein said executing step comprises, responsive to finding the given one of the triplets having the lower bound and the upper bound encompassing the keyvalue for the given record, and the operation being the search operation:
    retrieving the leaf node using the pointer to the leaf node included in the given one of the triplets; and
    finding the given record that includes the keyvalue for the given record in the leaf node.

9. The method of claim 6, wherein said executing step comprises, responsive to finding the given one of the triplets having the lower bound and the upper bound encompassing the keyvalue for the given record, and the operation being the deletion operation:
    retrieving the leaf node using the pointer to the leaf node included in the given one of the triplets;
    finding the given record that includes the keyvalue for the given record in the leaf node; and
    deleting the given record from the leaf node.

10. The method of claim 9, further comprising:
    updating the given triplet or another triplet when the lower bound or upper bound of the leaf node has changed, or deleting the given triplet or another triplet when the leaf node is removed.

11. The method of claim 1, further comprising:
    limiting a total number of triplets up to maximum threshold number of triplets; and
    deleting a particular record when the total number of triplets exceeds the maximum threshold number of triplets.

12. A computer program product for accelerating an operation in a B+-tree, the computer program product comprising a computer readable storage medium having program instructions embodied therewith, the program instructions executable by a computer to cause the computer to perform a method comprising:
    storing, by a disk-based memory, the B+-tree;
    storing, by a cache separate from the disk-based memory, triplets, each of the triplets including a pointer to a leaf node, a lower bound of a key on the leaf node, and an upper bound of the key on the leaf node;
    performing, by a triplet manager, a lookup operation on the triplets responsive to the operation to avoid traversals of intermediate nodes for the operation; and
    executing, by a processor, the lookup operation in the B+-tree while avoiding the traversals of the intermediate nodes for the operation responsive to a result of the lookup operation,
    wherein the operation is any one of an insertion operation, a deletion operation, and a search operation, and wherein the triplets are stored only in the cache, and are not stored in the disk-based memory.

13. The computer program product of claim 12, wherein performing the lookup operation comprises finding a given one of the triplets having the lower bound and the upper bound encompassing a keyvalue for a given record.

14. The computer program product of claim 13, wherein said executing step comprises, responsive to finding the given one of the triplets having the lower bound and the upper bound encompassing the keyvalue for the given record, and the operation being the insertion operation:
    retrieving the leaf node using the pointer to the leaf node included in the given one of the triplets; and
    inserting the given record into the leaf node.

15. The computer program product of claim 13, wherein said executing step comprises, responsive to finding the given one of the triplets having the lower bound and the upper bound encompassing the keyvalue for the given record, and the operation being the search operation:
    retrieving the leaf node using the pointer to the leaf node included in the given one of the triplets; and
    finding the given record that includes the keyvalue for the given record in the leaf node.

16. The computer program product of claim 13, wherein said executing step comprises, responsive to finding the given one of the triplets having the lower bound and the upper bound encompassing the keyvalue for the given record, and the operation being the deletion operation:
    retrieving the leaf node using the pointer to the leaf node included in the given one of the triplets;
    finding the given record that includes the keyvalue for the given record in the leaf node; and
    deleting the given record from the leaf node.

17. The computer program product of claim 12, further comprising:
    limiting a total number of triplets up to maximum threshold number of triplets; and deleting a particular record when the total number of triplets exceeds the maximum threshold number of triplets.

18. A system for accelerating an operation in a B+-tree, the system comprising:
a disk-based memory for storing the B+-tree;
a cache, separate from the disk-based memory, for storing triplets, each of the triplets including a pointer to a leaf node, a lower bound of a key on the leaf node, and an upper bound of the key on the leaf node;
a triplet manager for performing a lookup operation on the triplets responsive to the operation to avoid traversals of intermediate nodes for the operation; and
a processor for executing the lookup operation in the B+-tree while avoiding the traversals of the intermediate nodes for the operation responsive to a result of the lookup operation,
wherein the operation is any one of an insertion operation, a deletion operation, and a search operation, and wherein the triplets are stored only in the cache, and are not stored in the disk-based memory.

19. The system of claim 18, wherein the triplet manager performs the lookup operation by finding a given one of the triplets having the lower bound and the upper bound encompassing a keyvalue for a given record.

\* \* \* \* \*